C. CUMMINGS.
Carriage Wheel.
No. 87,913.
Patented March 16, 1869.
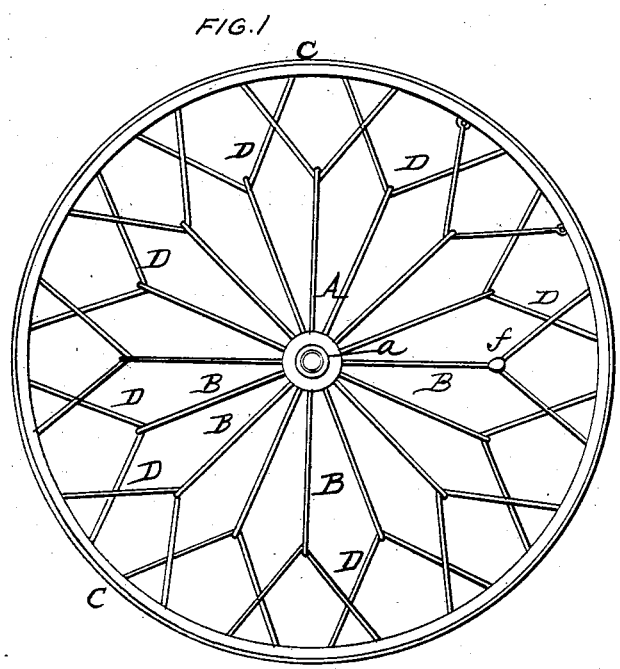
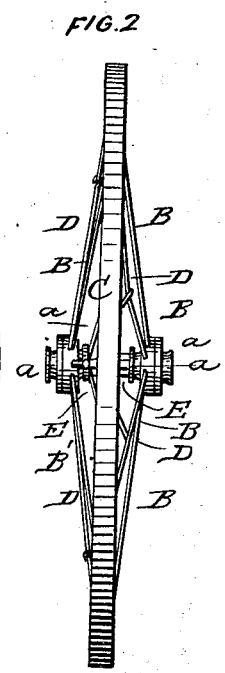
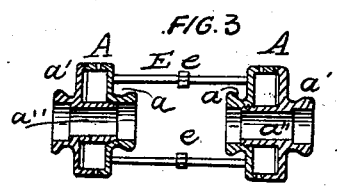
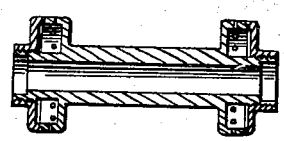
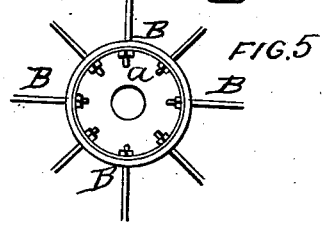
WITNESSES
INVENTOR

UNITED STATES PATENT OFFICE.

CHARLES CUMMINGS, OF PROVIDENCE, RHODE ISLAND.

IMPROVEMENT IN CARRIAGE-WHEELS.

Specification forming part of Letters Patent No. 87,913, dated March 16, 1869.

*To all whom it may concern:*

Be it known that I, CHARLES CUMMINGS, of Providence, in the county of Providence, and in the State of Rhode Island, have invented certain new and useful Improvements in Wheels for Carriages or other Vehicles; and do hereby declare that the following is a full, clear, and exact description thereof, reference being had to the accompanying drawing, making a part of this specification, in which—

Figure 1 is a side elevation. Fig. 2 is an edge view. Fig. 3 is a longitudinal section of the hub. Fig. 4 is a longitudinal section of another form of a hub. Fig. 5 is an enlarged view of one end of the hub with the cap removed.

Letters of like name and kind refer to like parts in each of the figures.

My invention is an improvement in wheels for use upon all kinds of vehicles, by means of which greater strength, durability, and lightness, to any extent, are secured; and it consists, principally, in the construction and arrangement of truss rods or spokes, which, by means of a crotched end upon each, enter the fellies at two points instead of one, as in wheels of ordinary construction, and furnish a more thorough and equal bearing for the weight upon said fellies and the rim of the wheel.

It also consists of the application of rubber to the joint between the straight and the crotched rods, for the purpose of preventing wear, and to avoid noise.

In the annexed drawing, A represents the hub, made in two sections, and each section in two parts, a and a', the inner half of each, a, being chambered out, so as to allow a nut to be placed upon the ends of the truss rods or spokes B, which enter said recesses through suitable holes, for the purpose of securing said rods to the hub. The outer half of each section, a', forms a cap or cover for the recess in the inner half, a, and is provided with a thimble, a'', which passes through said recess and screws into said inner half a, forming a bearing for the axle.

Radiating from equidistant points upon the cylindrical portion of each section are eight or more rods, of steel, iron, or other metal, which extend outward about two-thirds of the distance (more or less) from the hub to the rim C, and terminate in an eye, through which pass the centers of the crotched rods D, the ends of which pass through and are secured to the rim C by being headed down upon the outside of the tire. The hubs are so adjusted as that the rods B shall alternate, and the crotched rods D are sufficiently spread to enaqle each of their ends, where they enter the rim, to overlap those of the crotch upon either side, so that the circumference of said rim is equally divided by the points of entrance of the arms of said crotches.

It will be readily seen that if the rods B are drawn toward the center, or otherwise tightened, the rim and hub will be firmly connected together, so as to produce a wheel. This result is partly effected by means of the nuts upon the ends of the rods within the hub; but, in order that a greater strain may be caused, and also the hub extended to any desired length, three or more rods, E, are placed between and connected with the sections of each hub by means of a thread upon the ends of each rod, working within suitable holes tapped in said sections. The threads upon the ends of the rods are right and left handed, so that the sections will be drawn together or spread apart as the rods are turned to the right or left. In the center of each rod is a squared part, e, upon which a wrench may be used for the purpose of turning said rods.

This arrangement permits the rods B to be readily tightened, as by turning the extension-rods E, so as to draw the sections of the hub together, the strain upon said rods B is removed, and by removing the outer halves of the sections a', the nuts upon the ends of the rods may be tightened, after which, by again spreading the sections, any degree of strain upon said rods and the rim may be produced.

In Fig. 4 is shown another form of a hub, in which the sections are rigidly connected together and the caps or faces screwed upon the ends of the bearing for the axle. In using this hub the requisite degree of tension of the truss-rods can be secured by means of the nuts upon the ends of said rods within the hub.

It will be observed that the rim is more thoroughly and evenly supported than in ordinary wheels, as each truss rod or spoke enters said rim at two points instead of one, as is usual, making the distance between said points of entrance but one-half as great as in the others.

Other advantages arise from the use of the crotched rod, as by their lapping and breaking joints the strain thrown upon any point of the rim is distributed to the other parts of the wheel, and in striking a stone or other obstruction, instead of being stiff and unyielding, the fellies or rim are allowed to spring inward and break the shock, adding much to the ease of riding, the durability of the wheels, and also to that of the running-gear.

The principle upon which the crotched rods operate in making a spring of the fellies or rim will be readily understood. Said rods do not exert a strain upon the rim directly toward the center of the wheel, but draw it in opposite directions at angles of about thirty degrees from such a line; and when an unusual pressure is applied to any portion of said rim, the crotched rods whose ends are nearest that point allow it to yield, rocking upon or in the ends of the straight rods, so as to throw the latter to one side and permit the felly at the opposite end of the crotch to spring out until the pressure is removed, when the several parts again resume their positions.

If desired, the ends of the crotched rods may be provided with an eye or hook, and secured to the fellies by means of staples, as shown in Fig. 1. Both straight and crotched rods should be enlarged at their points of connection with each other, and in order to avoid rusting, wear, and unnecessary noise at that point, the joint should be covered by a piece of rubber, b, which effectually accomplishes the desired objects. This rubber may be cast upon the joint, or the end of the straight rod inserted and the crotched rod afterward passed through both the rubber and the eye of said straight rod, as may be desired.

It may prove advantageous to use more than one crotched rod upon each straight one, so that I do not confine myself to the exact arrangement shown, but claim the right to make such changes in the number or arrangement of such crotched rods as may be deemed best, without departing from the principle involved by their use.

The advantages possessed by this wheel over any in use are strength, durability, lightness, and ease in passing over stones or other obstructions, the latter quality rendering it not only far more durable and pleasant to the rider than those wheels which are rigid, but also increasing the durability of the running-gear, as shocks caused by passing over obstructions are only communicated to said running-gear in a modified degree.

Having thus fully set forth the nature and merits of my invention, what I claim as new is—

1. The crotched rods D D, &c., when connected to the rim of a wheel and to the truss-rods B, or their equivalent, substantially as shown, and for the purpose described.

2. The application of rubber upon the joint between the truss and crotched rods, substantially as and for the purpose specified.

In testimony that I claim the foregoing I have hereunto set my hand this 29th day of January, 1869.

CHARLES CUMMINGS.

Witnesses:
HENRY MARTIN,
CHARLES SELDEN.